United States Patent [19]

Kaczur et al.

[11] Patent Number: 5,376,240
[45] Date of Patent: Dec. 27, 1994

[54] PROCESS FOR THE REMOVAL OF OXYNITROGEN SPECIES FOR AQUEOUS SOLUTIONS

[75] Inventors: Jerry J. Kaczur; David W. Cawlfield; Kenneth E. Woodard, Jr., all of Cleveland, Tenn.

[73] Assignee: Olin Corporation, Stamford, Conn.

[21] Appl. No.: 156,326

[22] Filed: Nov. 23, 1993

Related U.S. Application Data

[63] Continuation-in-part of Ser. No. 787,455, Nov. 4, 1991, abandoned.

[51] Int. Cl.$^5$ .............................. C25B 1/00; C25B 1/10
[52] U.S. Cl. ......................... 204/128; 204/129; 204/130; 204/149; 210/748; 210/754; 210/760
[58] Field of Search ............... 204/129, 130, 128, 149; 210/745, 754, 760; C25B 1/00, 1/10

[56] References Cited

U.S. PATENT DOCUMENTS

| | | | |
|---|---|---|---|
| 3,542,657 | 11/1970 | Mindler et al. | 204/98 |
| 4,125,445 | 11/1978 | Hurley | 204/149 |
| 4,397,719 | 9/1983 | Yoshida | 204/91 |
| 4,632,737 | 12/1986 | Mindler | 204/98 |
| 4,834,850 | 5/1989 | de Nora et al. | 204/109 |
| 4,956,057 | 9/1990 | Stucki et al. | 204/101 |
| 4,990,266 | 2/1991 | Vorlop et al. | 210/748 |
| 5,094,734 | 3/1992 | Tonado | 204/234 |

FOREIGN PATENT DOCUMENTS 1409419 10/1975 United Kingdom .

OTHER PUBLICATIONS

"Chemical Removal of Nitrate From Water", NATURE, vol. 350, Mar. 21, 1991.
"Electrocatalytic Reduction of Nitrite & Nitric Oxide to Ammonia with Iron-Substituted Polyoxotungstates" by J. E. Toth & F. C. Anson, J. Am Chem. Soc., vol. 111, pp. 2444–2451 (1989). No month available.

*Primary Examiner*—Kathryn Gorgos
*Attorney, Agent, or Firm*—William A. Simons

[57] ABSTRACT

A process for electrochemically treating an aqueous solution containing inorganic oxynitrogen species is disclosed in which the aqueous solution is fed into the catholyte compartment of an electrochemical reduction cell using a high surface area cathode separated from an anolyte compartment to electrochemically reduce substantially all of the oxynitrogen species to nitrogen or ammonia and produce a purified water product.

37 Claims, 1 Drawing Sheet

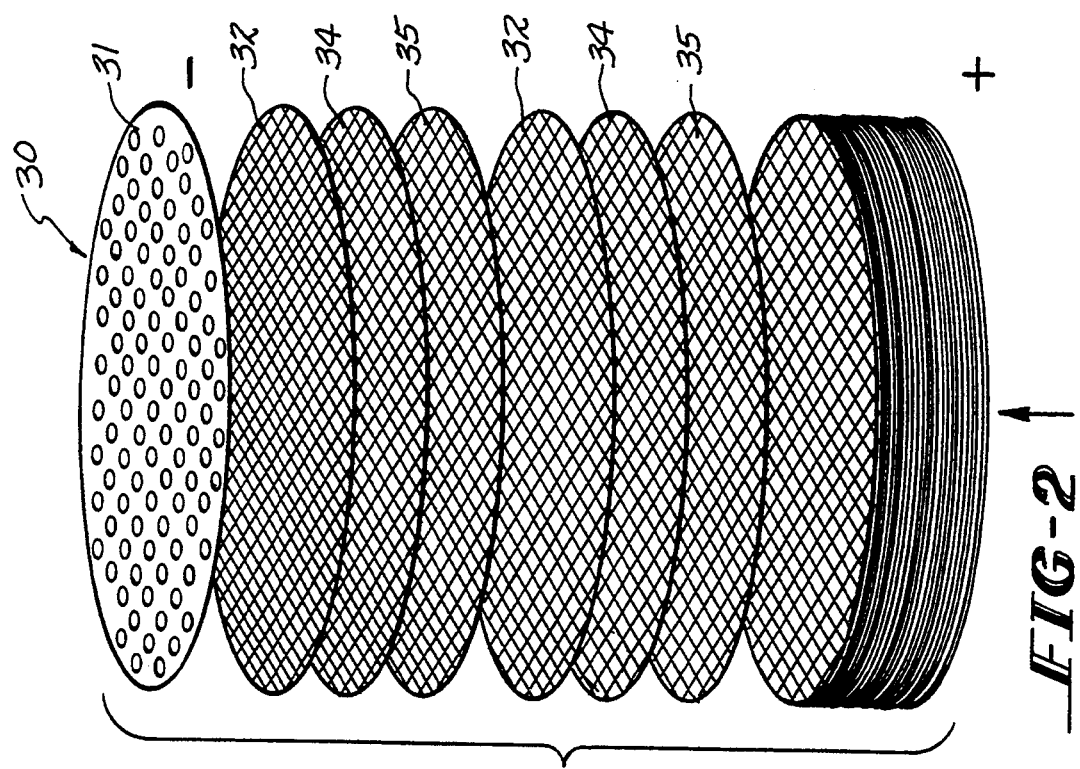
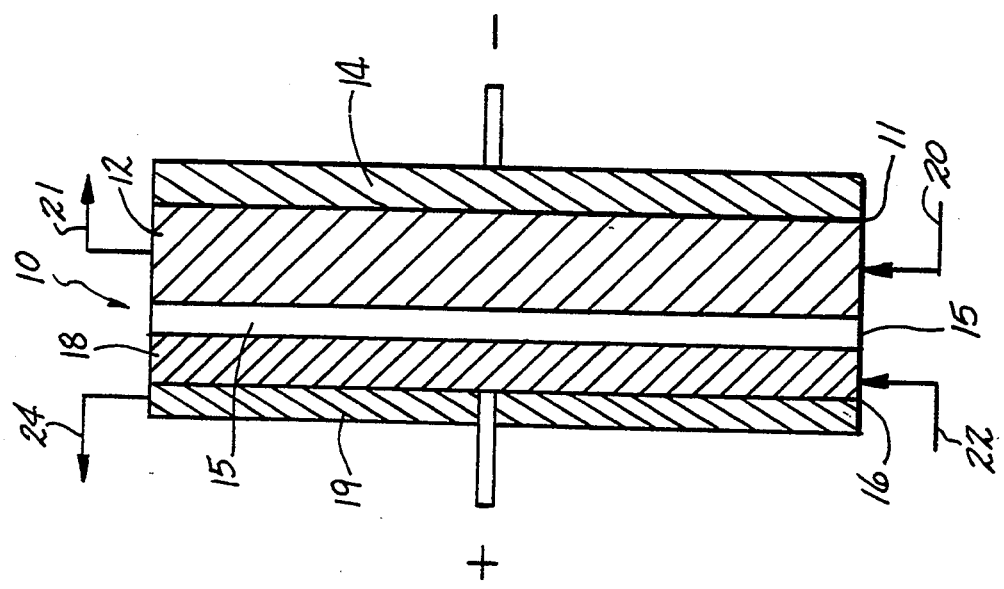

PROCESS FOR THE REMOVAL OF OXYNITROGEN SPECIES FOR AQUEOUS SOLUTIONS

CROSS-REFERENCE TO RELATED APPLICATION

This application is a continuation-in-part application of U.S. patent Application Ser. No. 07/787,455, filed Nov. 4, 1991 with Jerry J. Kaczur, David W. Cawlfield, and Kenneth E. Woodard, Jr. as the named inventors, now abandoned.

BACKGROUND OF THE INVENTION

1. Field of the Invention

This invention relates generally to the production of purified aqueous solutions. More particularly, the present invention relates to the electrochemical reduction of oxynitrogen species in aqueous solutions to remove such species by reducing them to environmentally safe forms, such as nitrogen gas or ammonia ions. The process and the apparatus employing the process are suitable for both waste water and potable water treatment. The electrochemical reduction occurs on a high surface area cathode structure. Both dilute and concentrated aqueous solutions of oxynitrogen species can be reduced to environmentally safe nitrogen by the process and apparatus of this invention.

2. Description of Related Art

Nitrogen-based fertilizers that are widely used in agriculture cause nitrite and nitrate pollution of ground water by rain water run off from farm fields. Manufacturing operations which utilize nitric acid can also produce waste streams containing nitrites and nitrates, as well as gaseous emissions containing oxygenated nitrogen gas species. These gaseous emissions can result in acid rainfall in the form of nitric acid. The presence of nitrites and nitrates in drinking water is undesirable because of their hazards to human health. As such, the maximum allowable concentrations of nitrites and nitrates in drinking water is limited by current governmental regulations to 10 parts per million. Much attention has recently been focused on drinking water treatment to remove nitrates and nitrites in both the United States and in Europe.

Prior approaches to remove or reduce nitrates and nitrites from aqueous streams require the use of either a chemical agent or an expensive process typically utilizing ion exchange, reverse osmosis, electrodialysis or distillation. Ion exchange methods require regeneration of the ion exchange resin beds or zeolites with salts or with acids or bases. The spent regenerants must be disposed of and cause further pollution and waste disposal problems. Such prior chemical methods are expensive, can require costly capital expenditures for processing equipment and can still create waste disposal problems. U.S. Pat. Nos. 4,956,057 and 4,990,266 describe recent approaches utilized to remove the nitrate/nitrite contaminants from aqueous streams. The former uses electrolytic reduction at the cathode to produce a gas containing $H_2$, $NH_3$, NO and $N_2O$, which is then passed through a catalyst bed for reaction to produce $N_2$ and $H_2O$. The latter chemical method utilizes catalytic hydrogenation with a palladium and/or rhodium or palladium and copper group metal catalyst impregnated into a porous metal carrier to produce nitrogen gas in a continuous catalytic reduction process in which the pH of the water is maintained at a level not greater than 8.

Biological approaches to destroy or reduce nitrates are also widely employed, but such approaches are generally slow, have variable results, and require large amounts of capital investment and large tracts of land.

These and other problems are solved by the process of the present invention which removes both nitrites and nitrates, as well as other oxynitrogen species, from aqueous solutions by the use of a specific electrochemical reduction process using a particular high surface area cathode.

BRIEF SUMMARY OF THE INVENTION

It is an object of the present invention to provide a process to remove oxynitrogen species, including nitrites and nitrates, from aqueous solutions as a part of a major water treatment process for waste water and potable water.

It is another object of the present invention to provide a process for employing the process to treat dilute aqueous solutions by electrochemically reducing oxynitrogen species therein and to remove them from the solution by reducing the nitrogen species to environmentally safe nitrogen gas and ammonia.

It is a feature of the present invention that the electrochemical reduction process can remove trace transition metal ions from the aqueous solution by depositing them onto the cathode surface.

It is another feature of the present invention that the electrochemical reduction process can be combined as a part of the method of treating drinking water in combination with a chlorine dioxide, chlorine or ozone oxidizing and disinfecting treatment system.

It is another feature of the present invention that a high surface area cathode is employed in the process of the present invention.

It is yet another feature of the present invention that the electrochemical reduction process operates at a high efficiency wherein the sum of the current efficiency and the removal efficiency of the oxynitrogen species is greater than about 50%.

It is still another feature of the present invention that the oxynitrogen species are electrochemically reduced on the cathode surface through various lower valence oxynitrogen species until ending preferably as nitrogen gas as the final end product.

It is an advantage of the present invention that the electrochemical reduction process can be used in an electrochemical cell to convert both low or high concentrations of oxynitrogen species in aqueous solutions to environmentally safe nitrogen gas or ammonia.

It is yet another advantage of the present invention that waste water effluents containing high levels of oxynitrogen species, such as nitrates and nitrites from industrial manufacturing operations using nitric acid, can be substantially reduced to environmentally safe nitrogen gas.

These and other objects, features and advantages are obtained in the process of the present invention by feeding an aqueous solution to be electrochemically reduced in a catholyte compartment of an electrochemical cell having a separator between the catholyte compartment and the anolyte compartment and using a high surface area cathode to electrochemically reduce substantially all of the oxynitrogen species in the aqueous solution to nitrogen gas at cell current densities of between about 0.01 to about 10 $KA/m^2$, cell temperatures of between about 0° to about 120° Centigrade, and an aqueous solution feed having a pH of less than about 4.

BRIEF DESCRIPTION OF THE DRAWINGS

These and other objects, features and advantages of the invention will become apparent upon consideration of the following detailed disclosure of the invention especially when is taken in conjunction with the accompanying drawings wherein:

FIG. 1 is a side elevational view of an electrochemical reduction cell which is useful with the process of the present invention; and FIG. 2 is an exploded view of a bipolar flow-through electrochemical cell stack.

DETAILED DESCRIPTION OF THE PREFERRED EMBODIMENT

FIG. 1 shows an electrochemical cell that can be employed to reduce the concentration of oxynitrogen species in aqueous solutions to environmentally safe nitrogen gas and/or ammonia. The cell is indicated generally by the numeral 10. Cell 10 comprises a catholyte compartment 11 and a anolyte compartment 16 separated by a separator 15. The separator 15 can be a diaphragm if the anode reaction does not generate chlorine or other undesirable products that must be kept separate from the catholyte products. Alternately, and more preferably, the separator 15 is a permselective cation exchange membrane. Suitable cation exchange membranes are those sold under the NAFION ® trademark by E. I. DuPont de Nemours and Company, those membranes sold under the FLEMION ® trademark produced by Asahi-Glass Company or the membranes described in U.S. Pat. No. 4,470,888. Hydrocarbon based membranes can also be used depending on their suitability at the cell's operating parameters, such as pH and temperature.

The catholyte compartment 11 contains a high surface area cathode 12 that has a specific surface area of greater than about 5 cm$^2$/cm$^3$ and is made from a high hydrogen overvoltage material. A cathode current distributor 14 is provided to distribute current to the cathode. The cathode current distributor 14 preferably is a solid distributor backplate but may also be perforated. The high surface area cathode 12, the current distributor plate 14 and the separator or cation exchange membrane 15 are mounted or assembled in direct contact in a zero-gap spacing arrangement.

The anolyte compartment 16 contains an anode material 18 that may be of expanded titanium metal with an oxygen catalyst coating. A spacer 19 is provided, functioning as a gas disengagement device, as well as providing physical spacing of the anode 18 from the separator 15 when the separator is an ion exchange membrane. A catholyte feed line 20 is diagrammatically illustrated as feeding aqueous solution into the bottom of the cell 10, while a catholyte compartment outlet line 21 is shown to remove the product of the reduction of the oxynitrogen species. Where anolyte is used, an anolyte feed line 22 is provided to feed either deionized water, softened water or non-oxidizing acids, such as dilute sulfuric acid, to the anolyte compartment 16. Deionized water can be used as the electrolyte if the membrane is in direct physical contact with the anode. The cell 10 can be operated in an anolyteless configuration when using a microporous diaphragm or in low current density operation with a water permeable separator.

Where an anolyte solution is provided, the solution flows through the anolyte compartment 16 to supply water for the oxidation of water at the electrode surface according to an oxidation reaction of:

$$2H_2O \rightarrow O_2 + 4H^+ + 4e^-$$

Oxygen gas is externally disengaged in an anolyte gas disengager (not shown). The aqueous solution being reduced is fed in through the catholyte feed line 20 to the high surface area cathode 12 where the oxynitrogen species are electrochemically reduced on the cathode surface through various lower nitrogen valence reduced nitrogen-oxygen intermediates, finally ending as nitrogen gas. The reduced solution and any by-product nitrogen gas or ammonia produced then exits the cell through the catholyte compartment outlet line 21 to flow to an external catholyte disengager (not shown) to separate hydrogen gas from the water stream. Hydrogen gas can be produced by the competing water reduction reaction that can occur at the cathode surface and reduce the efficiency of the reduction as follows:

$$2H_2O + 2e^- \rightarrow H_2 + 2OH^-$$

The electroreduced solution and by-product hydrogen produced may then pass out from the cell 10 into an optional external catholyte disengager (not shown) to separate the hydrogen gas from the product water stream.

The electrochemical reduction efficiency of the high surface area cathode is dependent upon a number of variables, such as the concentration of the nitrogen species, the flow rate of the aqueous solution through the high surface area cathode structure, the number of electrons required for the reduction of each nitrogen species, the residence time of the solution in the cathode structure, the high surface area cathode density, the cathode specific surface area, the hydrogen overvoltage and the electrochemical characteristics of the cathode material employed. One advantage of the present invention is that the electrochemical reduction is done at high efficiency since the sum of the current efficiency and the removal efficiency of the oxynitrogen species is greater than about 50%. The current efficiency is defined as the Faraday equivalent of the electrochemical reduction of the oxynitrogen species reduced to nitrogen gas or ammonia divided by the number of Faradays of electricity used.

The oxynitrogen species that can be dissolved in or in equilibrium with water and which can be reduced to include nitrogen dioxide, nitric oxide, nitrous oxide, dinitrogen dioxide, aqueous solutions of nitrates and nitrites, including alkali metal, organic and inorganic salts thereof. The net reduction reactions and the standard potentials for the reduction of nitrate ion in acid solutions can be as follows:

$$NO_3^- + 2H^+ + e^- \rightarrow NO_2(g) + H_2O$$

$E_o = +0.78$ Volts $$NO_3^- + 2H^+ + 2e^- \rightarrow NO_2^-(g) + H_2O$$

$E_o = +0.84$ Volts $$NO_3^- + 10H^+ + 8e^- \rightarrow NH_4^+ + 3H_2O$$

$E_o = +0.88$ Volts $$NO_3^- + 3H^+ + 2e^- \rightarrow HNO_2 + 2H_2O$$

$E_o = +0.94$ Volts $$NO_3^- + 4H^+ + 3e^- \rightarrow NO(g) + 2H_2O$$

$E_o = +0.96$ Volts $$2NO_3^- + 10H^+ + 8e^- \rightarrow N_2O(g) + 5H_2O$$

$E_o = +1.12$ Volts $$2NO_3^- + 12H^+ + 10e^- \rightarrow N_2(g) + 6H_2O$$

$E_o = +1.25$ Volts

It is believed that the nitrate ions are first reduced to nitrite ions and then to nitrogen with possibly trace amounts of NO or $NO_2$ gas formation in the electroreductive process of the present invention. An additional benefit from the use of the present electrochemical reduction process is that trace transition metal ions may be removed from the aqueous solution by being deposited onto the cathode surface. Typical metals that can be so removed include iron, nickel, zinc. These deposited metallic ions can be removed periodically by acid treatment of the cathode in situ or by replacing the cathode after a predetermined number of hours of operation. The periodic acid treatment of the cathode can help remove any alkaline earth deposits that may precipitate or form on the surface, such as calcium hydroxide or magnesium hydroxide.

The aqueous solution fed into the cell through catholyte feed line 20 is acidic and the pH may be adjusted to optimize the desired reduction. The preferred pH range of the aqueous feed solution is less than about 4, but more preferably is from about 0.1 to about 3.5 and, most preferably, at a pH of from about 1 to 3. The operating pH range will also be influenced by an aqueous cathode solution pH environment that might significantly corrode the selected cathode elements either during operation or shutdown. As previously mentioned, the by-products formed from the electroreduction are also dependent upon the aqueous feed solution pH.

The temperature of the cell 10 in operation can vary from about 0° to about 120° C., with a preferred temperature range being from about 5° to about 95° C. The aqueous solution feed stream can be preheated to increase the operating temperature, if necessary. The cell operating current density can be from about 0.01 to about 10 KA/m², with a more preferred range being from about 0.05 to about 3 KA/m². The potential heat build-up within the cell to above the operating temperature of the cell components caused by electrical resistance limits the cell operating current density. The limiting factors affecting the current efficiency are the concentration of the oxynitrogen species that are to be reduced and the potential increase in heat of the cell to above the operating temperature of its components by the effect of the electrical resistance heating. Operation in an optimum current efficiency range to reduce the process cost is also a potential limiting factor. Another limiting factor is the mass flow rate through the catholyte compartment, so that a higher flow rate increases the mass transfer and, therefore, the current efficiency. The average velocity of the flow of the aqueous solution through the catholyte compartment is in the range of 0.001 to about 50 feet per minute. The electrochemical reduction process is also adaptable for processing very slow flows on the order of grams per minute to flows greater than about 100 to about 1,000 gallons per minute. The oxynitrogen species concentration in the aqueous solution is preferred to be about 5% by weight or less.

Where an anolyte is utilized, deionized water is preferred, especially when the anode is in direct physical contact with the membrane. Other suitable anolytes that are appropriate include non-oxidizing acids in the range of about 0.1 to about 40% by weight solutions of non-oxidizing acids, such as, sulfuric acid, perchloric acid and phosphoric acid. Softened water may be also be used as the anolyte, but small amounts of chloride may produce small amounts of chlorine in the output anolyte stream. Any alkali metal ions, such as sodium, in the anolyte can be transferred to the catholyte, thereby forming alkali metal hydroxides, such as sodium hydroxide, in the solution product. This might be an advantage for acidic feed process streams where there is a need to increase the pH of the aqueous product after treatment in the catholyte compartment. In an alternative embodiment, the anolyte compartment can be filled with a strong acid sulfonic acid functionality ion exchange resin electrolyte in place of sulfuric acid. Deionized water would be added to the electrolyte.

A thin protective spacer material such as anode spacer 19 may be employed made from a chemically resistant plastic mesh to permit the use of expanded metal anodes. The spacer 19 can also be used to allow for gas disengagement behind the anode. Suitable materials include corrosion resistant plastics such as polyvinylidene fluoride, polyethylene, polypropylene and fluoropolymers, such as polytetrafluoroethylene.

The anode can be coated with an oxygen evolving catalytic coating such as an iridium oxide based coating on titanium, or any suitable valve or oxide forming metal that is stable as an oxygen evolution electrode. Other suitable anode coatings can include a platinum clad or platinum plated electrocatalytic coating. Other suitable anode coating types can include platinum or platinum/other precious metal or oxide coatings on valve metals such as titanium, niobium and tantalum. Perovskite based coatings made from transition metal type oxides prepared from cobalt, iron, and the like are also suitable, as is a conductive titanium oxide Magneli phase composition sold under the trade name of EBONEX ®.

The cathode current distributor 14 may be formed of any smooth, solid stainless steel type of material, such as types 304, 316, 310, and the like, transition metals such as copper, iron, nickel, zinc, aluminum or precious metal or precious metal coatings on various transition metal base structures, as well as gold, silver, palladium, platinum, and the like, and alloys thereof. A perforated sheet could also be employed where there are no significant feed solution flows bypassing the high surface area cathode structure.

The high surface area cathode may be made from any number of suitable materials, such as graphite, carbon, nickel, stainless steel, titanium, zirconium, iron, copper, zinc, aluminum, other transition metals and alloys thereof. Precious metals, such as gold, silver or palladium, or coatings thereof, could also be used. The electrode material preferably should be of the non-sacrificial type. A sacrificial type, such as an iron based material in the form of steel wool, could be used but would suffer from the disadvantage of corroding during periods of non-use or non-operation. Another sacrificial type of material is titanium, which suffers from the disadvantage of hydriding during operation. The high surface area cathode should preferably be formed of a high hydrogen overvoltage material. Materials with high hydrogen overvoltages have increased current efficiency and promote the desired reduction of the oxynitrogen species to nitrogen, instead of the electroreduction of water to hydrogen and $OH^-$ ions. The cathode can be coated or plated with oxides, such as ruthenium, rhodium, osmium, and palladium or other precious metal oxides, or mixtures thereof to enhance or catalyze the electroreductive conversion of the oxynitrogen species to nitrogen.

The cathode surface area is especially important for obtaining high current efficiency and oxynitrogen species conversion with one pass or single flow through processing. The specific surface area of the cathode structure can range from about 5 $cm^2/cm^3$ to about 5000 $cm^2/cm^3$, and more preferably, from about 10 $cm^2/cm^3$ to about 2000 $cm^2/cm^3$. The density of the high surface area cathode can range from about 0.5% to about 90% or more preferably from about 1% to about 80%, with an optimum range being from about 2 about 50%. The cathode density is defined as (1-void volume). For example, a 40% density means that the structure has a 60% void volume. The lower the density of the high surface area material, the lower is the flow pressure drop of the aqueous solution stream through the cathode structure.

The high surface area cathode material can be formed from any of the above-named materials in the form of felts made from fibers including sintered fiber structures, matted fibers, semi-sintered powders, woven cloths, foam structures or multiple layers of thin expanded or perforated sheets. The high surface area cathode can also be constructed in a gradient type of structure, that is using various fiber diameters and densities in various sections of the cathode structure to improve performance or reduce flow pressure drop through the structure. The gradient structure can also be used to enhance the current distribution through the structure. The high surface area cathode can be sintered to the cathode current distributor backplate as a unit. It is preferable to have a removable structure for ease of cathode 12 structure maintenance and replacement.

Cell 10 can be arranged also in a bipolar configuration or, alternatively, with internal electrolyte distribution, especially where the water being treated has a low conductivity. Another configuration, best seen in FIG. 2, is possible where the aqueous solution being treated may flow alternately through high surface area cathodes and low surface area anodes so that the oxynitrogen species are reduced while oxygen is liberated at the anode. In this instance, a cation exchange membrane is not required, but a non-conductive porous separator insulator 35 is used between the porous anode 34 and the porous cathode 32. The cell 30 has a perforated end plate 31 and is stacked in a bipolar flow-through configuration with a direction of flow being indicated by the arrow. Optimum operation of a bipolar cell of this configuration is pH-dependent. Operation in the 2-4 pH range with anode surfaces that are catalyzed for oxygen and evolution will maximize oxygen formation and minimize reoxidation of the chloride ions.

Another alternative cell design (not shown) may be employed for low current density and high flow rate operations and is especially suitable for potable water treatment. In this design, alternating layers of anode, membrane, porous cathode, cathode backplate and a plastic insulator are wrapped around an inner core. Electrical connections can be made at the core or at the outside edge of the layered roll, or both. In this design, the feed solution flows only through the cathode compartment and the anode operates by oxidizing water diffused through the membrane. This design presents the advantage of preventing solution contact with the anode and preventing the oxidation of any oxidizable chemical species present in the water, such as chloride to chlorine.

In order to exemplify the results achieved, the following examples are provided without any intent to limit the scope of the instant invention to the discussion therein. In the following examples, the presence of ammonia and $NO_x$ and NO gases, especially $NO_2$, was checked by visual inspection and by smell in the solution product samples and no appreciable quantities were noted.

EXAMPLE I

An electrochemical cell was assembled as shown in FIG. 1 consisting of an anode compartment and a cathode compartment separated by a cation membrane. An expanded titanium metal anode with a thin platinum electroplated coating and titanium welded post was mounted in the anode compartment in direct contact against a DuPont NAFION® 117 cation ion exchange membrane. An expanded plastic spacer about 0.0625 inch (0.1588 cm) thick expanded constructed of TEFLON® polytetrafluoroethylene was used to position the anode against the membrane and to provide an anolyte liquid/gas disengagement zone behind the anode. The anode dimensions were about 3 inches (7.62 cm) by about 12 inches (30.48 cm) with a projected area of about 36 $in^2$ (0.0232 $m^2$)

A solid 316 stainless steel plate with about a 0.030 inch (0.762 cm) thickness and a welded 316 stainless steel bolt connection was used as the cathode current distributor. The cathode dimensions were about 3 inches (7.62 cm) by about 12 inches (30.48 cm) with a projected area of about 36 $in^2$ (0.0232 $m^2$). A hand laid metallic felt mat made from about 35.6 gm of about 0.0025 inch (0.00635 cm) wide by about 0.0035 inch (0.00889 cm) thick fine copper fibers was positioned directly in contact against the membrane and the cathode current distributor plate. The copper felt was compressed into the cathode compartment recess: the depth of which was approximately about 1/16 inch (0.1588 cm) upon final cell assembly. The copper cathode felt had a calculated specific surface area of about 58.2 $cm^2/cm^3$.

Deionized water was metered through a rotameter into the anode compartment at a rate of about 2.0 ml/min. There was about a 10 ppm nitrate ($NO_3^-$) ion concentration solution with an initial pH of about 6.60 prepared using deionized water and reagent grade sodium nitrate. The aqueous feed was metered at various flow rates into the bottom of the cathode compartment, upwardly through the thickness of the high surface area copper felt, and perpendicular to the applied current. The feed solution mass flow rate was set at about 55 gm/min and the applied current was varied in the experiments. The nitrate/nitrite ion concentrations in the feed solution and product solution output from the electroreduction cell were analyzed by ion chromatography using a conductivity detector. The test data is given in Table I.

solution samples when they were made alkaline with about 10% by weight sodium hydroxide.

TABLE II

NITRATE ION REDUCTION USING HIGH SURFACE AREA COPPER CATHODE
Cathode: 36.5 gm Copper Felt, 2.5 mil × 3 mil Fibers

| SAMPLE | SOLUTION FEEDRATE (gm/min) | CELL AMPERES | CELL VOLTAGE | PRODUCT SOLUTION pH | IC ION ANALYSIS | | TOTAL $NO_3^-$ & $NO_2^-$ REDUCTION (%) | CURRENT EFFICIENCY % BASED ON $NO_3^-$ REDUCTION TO NITROGEN |
|---|---|---|---|---|---|---|---|---|
| | | | | | NITRATE ($NO_3^-$) PPM | NITRITE ($NO_2^-$) PPM | | |
| AQUEOUS FEED SOLUTION → | | | | 6.92 | 9.4 | <0.2 | | |
| S#1 | 55.0 | 0.20 | 2.08 | 9.82 | 7.0 | 0.6 | 19.1 | 6.4 |
| S#2 | 27.8 | 0.20 | 2.15 | 10.01 | 4.7 | <0.2 | 50.0 | 8.5 |
| S#3 | 11.7 | 0.20 | 2.19 | 10.14 | 2.5 | 0.4 | 69.1 | 4.9 |
| Feed Solution Acidified To pH of 4.08 pH With HCl | | | | | | | | |
| S#4 | 55.0 | 0.20 | 2.11 | 6.66 | 7.0 | 0.4 | 21.3 | 7.1 |
| S#5 | 27.8 | 0.20 | 2.12 | 8.92 | 4.7 | 0.6 | 43.6 | 7.4 |
| S#6 | 11.7 | 0.20 | 2.16 | 9.55 | 2.0 | 0.4 | 74.5 | 5.3 |
| S#7 | 27.8 | 0.41 | 2.30 | 9.10 | 3.7 | 0.5 | 55.3 | 4.6 |
| S#8 | 27.8 | 0.60 | 2.35 | 9.13 | 3.5 | 0.4 | 58.5 | 3.3 |

At the 55 gm/min mass feed flow rate, the highest total nitrate/nitrite reduction percent was at about 27%, reducing the nitrate from about 10 ppm to about 6.5 ppm at an applied amperage of about 1.00 amperes and current efficiency based on $NO_3^-$ ion reduction to nitrogen of about 3.3%. A small amount of (about 0.8 ppm) of nitrite ion was present in the product solution. No ammonia smell was noted in any of the aqueous product solution samples when they were made alkaline with about 10% by weight sodium hydroxide.

TABLE I

NITRATE ION REDUCTION USING HIGH SURFACE AREA COPPER CATHODE
Cathode: 36.5 gm Copper Felt, 2.5 mil × 3 mil Fibers

| SAMPLE | SOLUTION FEEDRATE (gm/min) | CELL AMPERES | CELL VOLTAGE | PRODUCT SOLUTION pH | IC ION ANALYSIS | | TOTAL $NO_3^-$ & $NO_2^-$ REDUCTION (%) | CURRENT EFFICIENCY % BASED ON $NO_3^-$ REDUCTION TO NITROGEN |
|---|---|---|---|---|---|---|---|---|
| | | | | | NITRATE ($NO_3^-$) PPM | NITRITE ($NO_2^-$) PPM | | |
| AQUEOUS FEED SOLUTION → | | | | 6.60 | 10.0 | <0.2 | | |
| S#1 | 55.0 | 0.12 | 1.96 | 8.92 | 8.3 | <0.2 | 17.0 | 8.4 |
| S#2 | 55.0 | 0.22 | 2.12 | 9.55 | 8.3 | 0.4 | 13.0 | 3.5 |
| S#3 | 55.0 | 0.40 | 2.32 | 9.67 | 7.0 | 0.8 | 22.0 | 3.3 |
| S#4 | 55.0 | 1.00 | 2.49 | 9.63 | 6.5 | 0.8 | 27.0 | 1.6 |
| S#5 | 55.0 | 2.02 | 2.64 | 9.55 | 7.5 | 0.6 | 19.0 | 0.6 |
| S#6 | 55.0 | 3.05 | 2.74 | 9.63 | 7.0 | 0.6 | 24.0 | 0.5 |

EXAMPLE II

The same cell as in Example I was used. An aqueous feed solution was prepared from sodium nitrate and contained about 9.4 ppm of $NO_3^-$ in deionized water. It had a pH of about 6.92. The solution flow rate through the electrochemical cell cathode was varied, as well as the applied amperage. The experimental data is given in Table II.

The first 3 data sets, using an amperage of about 0.20 amperes and varying the flow rate, showed increasing nitrate/nitrite percent reduction with decreasing flow through the high surface area copper cathode structure. The total nitrate/nitrite reduction percentage increased from about 19.1% to about 69.1% as the flow decreased from about 55 gm/min to about 11.7 gm/min. The pH of the product solution increased in alkalinity with the reduction of nitrate in the product solution.

The feed solution was then acidified to a pH of about 4.08 using HCl in a second set of tests. The nitrate reduction efficiency was generally slightly higher using the lower pH feed solution versus the feed solution with the pH of about 6.92 at the same operating conditions. No ammonia smell was noted in any of the product

EXAMPLE III

The same electrochemical cell as in Example I was used, except for a change in the high surface area cathode material. A solid 316 stainless steel plate with about a 0.030 inch (0.762 cm) thickness and welded 316 stainless bolt connection was used as the cathode current distributor. The cathode dimensions were about 3 inches (7.62 cm) by about 12 inches (30.48 cm) with a projected area of about 36 in$^2$ (0.0232 m$^2$). Two layers of about 0.125 inch (0.1375 cm) graphite felt from National Electric Carbon (NEC) were positioned directly in contact against the cation membrane and the cathode current distributor plate. The two felts were compressed to the cathode compartment recess depth, which was approximately about ⅛ inch (0.3175 cm) upon cell assembly. The NEC graphite felt had a specific surface area of about 300 cm$^2$/cm$^3$.

Deionized water was metered through a rotameter into the anode compartment at a rate of about 2.0 ml/min. There was about a 12.2 ppm $NO_3^-$ aqueous solution with a pH of about 6.70 prepared from sodium nitrate and deionized water metered at various flow rates into the bottom of the cathode compartment, upwardly through the thickness of the high surface area graphite felt, and perpendicular to the applied current. The flow rate and applied current were varied in the experiments. The nitrate/nitrite ion concentrations in the feed solutions and in the product output from the electroreduction cell were analyzed by ion chromatography. The test results are shown in Table III.

The test results show that the nitrate/nitrite reduction percentage was lower with the carbon felt cathode than with the copper felt anode in Example I & II. The highest nitrate reduction percentage was about 19.7%. No significant amounts of nitrite or ammonia were detected in the product solutions.

and current efficiency of about 1.0%. No significant amounts of nitrite or ammonia were detected in the product solutions.

TABLE III

NITRATE ION REDUCTION USING HIGH SURFACE AREA GRAPHITE CATHODE
Cathode: 2 Layers Of 1/16" Thick NEC Graphite Felt

| SAMPLE | SOLUTION FEEDRATE (gm/min) | CELL AMPERES | CELL VOLTAGE | PRODUCT SOLUTION pH | IC ION ANALYSIS NITRATE ($NO_3^-$) PPM | IC ION ANALYSIS NITRITE ($NO_2^-$) PPM | TOTAL $NO_3^-$ & $NO_2^-$ REDUCTION (%) | CURRENT EFFICIENCY % BASED ON $NO_3^-$ REDUCTION TO NITROGEN |
|---|---|---|---|---|---|---|---|---|
| AQUEOUS FEED SOLUTION → | | | | 6.70 | 12.2 | <0.2 | | |
| S#1 | 55.0 | 0.11 | 2.33 | 6.20 | 10.5 | <0.2 | 13.9 | 11.0 |
| S#2 | 55.0 | 0.20 | 2.46 | 6.50 | 10.5 | <0.2 | 13.9 | 6.1 |
| S#3 | 55.0 | 0.39 | 2.57 | 6.57 | 9.8 | <0.2 | 19.7 | 4.4 |
| S#4 | 55.0 | 1.00 | 2.70 | 6.71 | 11.0 | <0.2 | 9.8 | 0.9 |
| S#5 | 55.0 | 2.01 | 2.87 | 8.66 | 10.5 | <0.2 | 13.9 | 0.6 |
| S#6 | 55.0 | 3.06 | 3.02 | 9.34 | 9.8 | <0.2 | 19.7 | 0.6 |
| S#7 | 27.8 | 0.20 | 2.42 | 6.77 | 10.5 | <0.2 | 13.9 | 3.1 |
| S#8 | 11.7 | 0.20 | 2.42 | 8.75 | 10.5 | <0.2 | 13.9 | 1.3 |

TABLE IV

NITRATE ION REDUCTION USING HIGH SURFACE AREA 316 STAINLESS CATHODE
Cathode: 12.50 gm of 12 Micron Stainless 316 Fibers

| SAMPLE | SOLUTION FEEDRATE (gm/min) | CELL AMPERES | CELL VOLTAGE | PRODUCT SOLUTION pH | IC ION ANALYSIS NITRATE ($NO_3^-$) PPM | IC ION ANALYSIS NITRITE ($NO_2^-$) PPM | TOTAL $NO_3^-$ & $NO_2^-$ REDUCTION (%) | CURRENT EFFICIENCY % BASED ON $NO_3^-$ REDUCTION TO NITROGEN |
|---|---|---|---|---|---|---|---|---|
| AQUEOUS FEED SOLUTION → | | | | 6.38 | 8.9 | <0.2 | | |
| S#1 | 55.0 | 0.11 | 2.21 | 6.70 | 7.4 | <0.2 | 16.9 | 9.7 |
| S#2 | 55.0 | 0.20 | 2.39 | 7.44 | 7.4 | <0.2 | 16.9 | 5.3 |
| S#3 | 55.0 | 0.40 | 2.55 | 8.93 | 7.4 | <0.2 | 16.9 | 2.7 |
| S#4 | 55.0 | 1.04 | 2.85 | 9.18 | 6.7 | <0.2 | 24.7 | 1.5 |
| S#5 | 27.8 | 0.40 | 2.55 | 9.50 | 6.4 | <0.2 | 28.1 | 2.3 |
| S#6 | 27.8 | 1.04 | 2.84 | 9.60 | 6.0 | <0.2 | 32.6 | 1.0 |

EXAMPLE IV

The same electrochemical cell used in Example III was reassembled identically, except for replacing the high surface area graphite felt with a high surface area stainless steel felt. Two layers of about 0.500 cm thick type 316L stainless steel felt sold under the tradename BEKITHERM® by WB Bekaert Corporation with about a 12 micron fiber size and approximately 0.63% density were positioned directly in contact against the membrane and the cathode current distributor plate. The two felt layers were compressed to the cathode compartment recess depth, which was about ⅛ inch (0.3175 cm) upon cell assembly. The density of the stainless steel felt increased to about 2% density and the calculated specific surface area of the stainless steel felt in this condition was about 130 $cm^2/cm^3$.

In the experiment below, deionized water was metered through a rotameter into the anode compartment at a rate of about 2.0 ml/min. There was about an 8.9 ppm $NO_3^-$ aqueous solution with a pH of about 6.38 prepared from sodium nitrate and deionized water metered at various flow rates into the bottom of the cathode compartment, upwardly through the thickness of the high surface area stainless steel felt, and perpendicular to the applied current. The flow rate and applied current were varied. The nitrate/nitrite ion concentrations in the feed solutions and in the product output from the electroreduction cell were analyzed by ion chromatography. The test data is shown in Table IV.

The test results show that the nitrate/nitrite reduction percentage was generally lower with a stainless steel felt cathode than with the copper felt cathode in Examples I & II. The highest nitrate reduction percentage was about 32.6% at a flow rate of about 27.8 g/min

EXAMPLE V

The sample electrochemical cell used in Example I was reassembled identically except for replacing the high surface area copper felt with about 45 gm of new copper felt for a specific surface area of about 73.6 $cm^2/cm^3$.

Deionized water was metered through a rotameter into the anode compartment at a rate of about 2.0 ml/min. There was about an 85 ppm $NO_3^-$ aqueous solution with a pH of about 6.97 prepared from sodium nitrate and deionized water metered at various flow rates into the bottom of the cathode compartment, upwardly through the thickness of the high surface area copper felt, and perpendicular to the applied current. The flow rate and applied current were varied. The nitrate/nitrite ion concentrations in the feed solutions and in the product output from the electroreduction cell were analyzed by ion chromatography. The test data is shown in Table V.

The test results for the first 5 samples showed a maximum nitrate/nitrite reduction of about 18.8% with a current efficiency of about 8.1% at a flow rate of about 16 gm/min and amperage of about 0.41 amps. The product solutions turned increasingly alkaline with increasing nitrate reduction. Significant amounts of nitrite was detected in the product solutions, but no ammonia was detected upon the addition of about 10% NaOH to the samples.

The feed solution was then acidified during the last part of the run using concentrated HCl to get a pH of about 2.15. The lower pH feed significantly increased the nitrate/nitrite reduction percent to about 43.5% at about a 55 gm/min flow rate and amperage of about 1.00 amps versus about 12.9% for the feed solution having a pH of about 6.97 at the same operating conditions. The current efficiency also increased correspondingly to about 26.4% versus about 7.8%. At similar cell amperage conditions at about 27.8 gm/min flow rate, the solution having a pH of about 2.15 had about a 71.8% nitrate reduction versus about 17.6% for the feed solution having a pH of about 6.97. The product nitrite concentrations for the acidified feed solutions could not be measured because of interference with the chloride added to the solution. This test demonstrates that the nitrate reduction removal efficiency increases with lower pH aqueous feeds.

gm/min and an applied amperage of about 1.01 amps, the nitrate/nitrite reduction percentage increased from about 30.6% to about 49.4% to greater than about 94.1% as the feed pH decreased from about 7.60 to about 3.05 to about 2.26, respectively. This test demonstrates that the nitrate reduction removal efficiency increases with lower pH aqueous feeds. No ammonia was detected upon the addition of about 10% NaOH to the samples. The scope of the intended claims is intended to encompass all obvious changes in the details, materials, and arrangements of parts, which will occur to one of skill in the art upon a reading of the disclosure. For example, while the reduction has primarily been

TABLE V

NITRATE ION REDUCTION USING HIGH SURFACE AREA COPPER CATHODE
Cathode: 45.0 gm Copper Felt, 2.5 mil × 3 mil Fibers

| SAMPLE | SOLUTION FEEDRATE (gm/min) | CELL AMPERES | CELL VOLTAGE | PRODUCT SOLUTION pH | IC ION ANALYSIS NITRATE ($NO_3^-$) PPM | IC ION ANALYSIS NITRITE ($NO_2^-$) PPM | TOTAL $NO_3^-$ & $NO_2^-$ REDUCTION (%) | CURRENT EFFICIENCY % BASED ON $NO_3^-$ REDUCTION TO NITROGEN |
|---|---|---|---|---|---|---|---|---|
| AQUEOUS FEED SOLUTION → | | | | 6.97 | 85 | <2 | | |
| S#1 | 55.0 | 1.00 | 2.56 | 9.70 | 63 | 11 | 12.9 | 7.8 |
| S#2 | 27.8 | 1.00 | 2.56 | 10.10 | 56 | 14 | 17.6 | 5.4 |
| S#3 | 27.8 | 0.41 | 2.41 | 9.94 | 61 | 9 | 17.6 | 13.2 |
| S#4 | 16.0 | 0.41 | 2.42 | 10.21 | 56 | 13 | 18.8 | 8.1 |
| S#5 | 55.0 | 0.41 | 2.40 | 9.51 | 72 | 9 | 4.7 | 7.0 |
| Feed Solution Acidified To pH Of 2.15 Using Concentrated HCl: | | | | | | | | |
| S#6 | 55.0 | 1.00 | 2.51 | 2.23 | 48 | NM | 43.5 | 26.4 |
| S#7 | 27.8 | 1.00 | 2.51 | 2.30 | 24 | NM | 71.8 | 22.0 |

NOTE:
NM - Not Measurable Due To Cl— Interference In IC Analysis.

EXAMPLE VI

The same electrochemical cell used in Example 5 was used in this set of tests. Deionized water was metered through a rotameter into the anode compartment at a rate of about 2.0 ml/min. There was about an 85 ppm aqueous $NO_3^-$ solution with a pH of about 7.60 prepared from sodium nitrate and chlorinated tap water metered at various flow rates into the bottom of the cathode compartment, upwardly through the thickness of the high surface area copper felt, and perpendicular to the applied current. The flow rate, applied current, and feed pH were varied in the experiments. The nitrate/nitrite ion concentrations in the feed solutions and in the product output from the electroreduction cell were analyzed by ion chromatography. The test data is shown in Table VI.

The test results show that the total nitrate/nitrite reduction and current efficiency increased with decreasing feed pH. At a mass flow rate of about 16 described as occurring in an aqueous feed solution that is reduced in a single pass through the cell 10, it is possible to recycle the feed solution multiple times to increase the total percentage of desired oxynitrogen species reduction. It is also possible to add salts, such as alkali metal chlorides, sulfates, phosphates or carbonates, to the feed solution to increase the efficiency of the high surface area cathodes. The process also has the potential to be used to remove water soluble or water emulsions of nitrate esters, such as those produced during gunpowder manufacturing operations. It is also possible to use the process in a cell where the separators or membranes are vertically positioned with a sleeve surrounding them. Lastly, it should be noted that the electrochemical reduction process of the present invention can be incorporated as a part of the method of treating drinking water in combination with a chlorine dioxide, chlorine, or ozone or combinations thereof oxidizing and disinfecting treatment system.

TABLE VI

NITRATE ION REDUCTION USING HIGH SURFACE AREA COPPER CATHODE
Cathode: 45.0 gm Copper Felt, 2.5 mil × 3 mil Fibers

| SAMPLE | SOLUTION FEEDRATE (gm/min) | CELL AMPERES | CELL VOLTAGE | PRODUCT SOLUTION pH | IC ION ANALYSIS NITRATE ($NO_3^-$) PPM | IC ION ANALYSIS NITRITE ($NO_2^-$) PPM | TOTAL $NO_3^-$ & $NO_2^-$ REDUCTION (%) | CURRENT EFFICIENCY % BASED ON $NO_3^-$ REDUCTION TO NITROGEN |
|---|---|---|---|---|---|---|---|---|
| AQUEOUS FEED SOLUTION → | | | | 7.60 | 85 | <2 | | |
| S#1 | 55.0 | 1.01 | 2.49 | 8.24 | 72 | <2 | 15.3 | 9.2 |
| S#2 | 27.8 | 1.01 | 2.48 | 8.85 | 66 | 4 | 17.6 | 5.4 |
| S#3 | 16.0 | 1.01 | 2.48 | 9.05 | 56 | 3 | 30.6 | 5.3 |
| S#4 | 7.7 | 1.01 | 2.48 | 9.18 | 46 | 9 | 35.3 | 3.0 |
| Feed Solution Acidified To pH Of 3.05 Using Concentrated H2SO4: | | | | | | | | |
| S#5 | 55.0 | 1.01 | 2.45 | 3.85 | 60 | 9 | 18.8 | 11.3 |
| S#6 | 27.8 | 1.01 | 2.45 | 5.75 | 44 | 13 | 32.9 | 10.0 |
| S#7 | 16.0 | 1.01 | 2.45 | 6.50 | 30 | 13 | 49.4 | 8.6 |
| S#8 | 7.7 | 1.01 | 2.45 | 7.14 | <5 | <2 | >94.1 | >7.1 |
| Feed Solution Acidified To pH Of 2.26 Using Concentrated H2SO4: | | | | | | | | |
| S#9 | 27.8 | 1.02 | 2.45 | 2.58 | 17 | <2 | 80.0 | 24.0 |

TABLE VI-continued

NITRATE ION REDUCTION USING HIGH SURFACE AREA COPPER CATHODE
Cathode: 45.0 gm Copper Felt, 2.5 mil × 3 mil Fibers

| SAMPLE | SOLUTION FEEDRATE (gm/min) | CELL AMPERES | CELL VOLTAGE | PRODUCT SOLUTION pH | IC ION ANALYSIS NITRATE ($NO_3^-$) PPM | IC ION ANALYSIS NITRITE ($NO_2^-$) PPM | TOTAL $NO_3^-$ & $NO_2^-$ REDUCTION (%) | CURRENT EFFICIENCY % BASED ON $NO_3^-$ REDUCTION TO NITROGEN |
|---|---|---|---|---|---|---|---|---|
| S#10 | 16.0 | 1.02 | 2.45 | 2.70 | <5 | <2 | >94.1 | >16.3 |
| S#11 | 55.0 | 1.02 | 2.44 | 2.43 | 38 | <2 | 55.3 | 32.9 |

What is claimed is:

1. A process for electrochemically treating an aqueous solution containing oxynitrogen species, comprising the steps of:
   (a) feeding the aqueous solution having a pH of less than about 4 into a catholyte compartment of an electrochemical reduction cell having a separator separating the catholyte compartment from an anolyte compartment;
   (b) utilizing a high surface area, high hydrogen overvoltage cathode to electrochemically reduce the oxynitrogen species in the aqueous solution in the catholyte compartment to nitrogen gas substantially free of nitrous oxide and nitrogen oxide to produce a purified product stream of water having nitrogen gas, hydrogen gas and a residual quantity of oxynitrogen species; and
   (c) withdrawing the product stream from the catholyte compartment.

2. The process according to claim 1 further comprising separating the hydrogen gas and nitrogen gas from the product stream.

3. The process according to claim 1 further comprising feeding aqueous solutions having a concentration of oxynitrogen species of about 5% by weight or less to the catholyte compartment.

4. The process according to claim 1 said aqueous solution feed has a pH of between about 0.1 and about 4.

5. The process according to claim 4 said aqueous solution fed to the catholyte compartment has a pH of between about 1 and about 3.

6. The process according to claim 4 further comprising removing trace transition metal ions from the aqueous solution by depositing them on the high surface area cathode.

7. The process according to claim 6 further comprising periodically acid treating the cathode to remove built up deposits of the trace transition metals and any alkaline earth salt deposits.

8. The process according to claim 4 further comprising using an anode that is placed against the cation exchange membrane.

9. The process according to claim 4 further comprising treating the aqueous solution as part of a potable water treatment process.

10. The process according to claim 9 further comprising first treating the aqueous solution external of the electrochemical reduction cell with an agent selected from the group consisting of chlorine dioxide, chlorine and ozone or combinations thereof.

11. The process according to claim 4 further comprising treating the aqueous solution external of the electrochemical reduction cell as part of a waste water treatment process.

12. The process according to claim 1 further comprising using a high surface area, high overvoltage cathode having a specific surface area of from about 5 cm$^2$/cm$^3$ to about 5000 cm$^2$/cm$^3$.

13. The process according to claim 1 further comprising using a high surface area, high overvoltage cathode having a density of about 0.5% to about 90%.

14. The process according to claim 1 further comprising feeding the aqueous solution through the electrolytic cell in a single pass.

15. The process according to claim 1 further comprising electrochemically reducing substantially all of the oxynitrogen species in the catholyte compartment to nitrogen to produce a purified product of water having less than 10 parts per million oxynitrogen species.

16. The process according to claim 1 further comprising electrochemically reducing substantially all of the oxynitrogen species in the catholyte compartment to nitrogen to produce a purified product of water having less than 0.5 parts per million oxynitrogen species.

17. The process according to claim 1 further comprising feeding a dilute electrolyte selected from the group consisting of deionized water, softened water and nonoxidizable acids to the anolyte compartment.

18. The process according to claim 17 further comprising electrochemically oxidizing the dilute electrolyte in the anolyte compartment to produce oxygen.

19. The process according to claim 1 further comprising using a cation exchange membrane as the separator.

20. The process according to claim 1 further comprising using a diaphragm as the separator.

21. A process for electrochemically treating an aqueous solution containing inorganic oxynitrogen species, comprising the steps of:
   (a) feeding the aqueous solution having a pH of less than 4 into a catholyte compartment of an electrochemical reduction cell having a separator separating the catholyte compartment from an anolyte compartment;
   (b) utilizing a high surface area cathode to electrochemically reduce at high efficiency substantially all of the oxynitrogen species in the aqueous solution in the catholyte compartment to nitrogen substantially free of nitrous oxide and nitrogen oxide to produce a purified water product stream having nitrogen gas, hydrogen gas and residual oxynitrogen species, the high efficiency reduction being characterized by having a current efficiency and an oxynitrogen removal efficiency whose sum is greater than 50%; and
   (c) withdrawing the product stream from the catholyte compartment.

22. The process according to claim 21 further comprising separating the hydrogen gas and nitrogen gas from the product stream.

23. The process according to claim 21 further comprising feeding aqueous solutions having a concentration of oxynitrogen species of about 5% by weight or less to the catholyte compartment.

24. The process according to claim 21 further comprising feeding a dilute electrolyte selected from the group consisting of deionized water, softened water and non-oxidizable acids to the anolyte compartment.

25. The process according to claim 24 further comprising electrochemically oxidizing the dilute electrolyte in the anolyte compartment to produce oxygen.

26. The process according to claim 25 said aqueous solution fed to the catholyte compartment has a pH of between about 0.1 and about 4.

27. The process according to claim 26 said aqueous solution fed to the catholyte compartment has a pH of between about 1 and about 3.

28. The process according to claim 27 further comprising treating the aqueous solution as part of a potable water treatment process.

29. The process according to claim 28 further comprising first treating the aqueous solution external of the electrochemical reduction cell with an agent selected from the group consisting of chlorine dioxide, chlorine and ozone or combinations thereof.

30. The process according to claim 29 further comprising treating the aqueous solution as part of a waste water treatment process.

31. The process according to claim 30 further comprising electrochemically reducing substantially all of the oxynitrogen species in the catholyte compartment to nitrogen to produce a purified product of water having less than 10 parts per million oxynitrogen species.

32. The process according to claim 31 further comprising electrochemically reducing substantially all of the oxynitrogen species in the catholyte compartment to nitrogen to produce a purified product of water having less than 0.5 parts per million oxynitrogen species.

33. The process according to claim 32 further comprising using a cation exchange membrane as the separator.

34. The process according to claim 33 further comprising using a diaphragm as the separator.

35. The process according to claim 34 further comprising using a high surface area, high overvoltage cathode having a specific surface area of from about 5 $cm^2/cm^3$ to about 5000 $cm^2/cm^3$.

36. The process according to claim 35 further comprising using a high surface area, high overvoltage cathode having a density of about 0.5% to about 90%.

37. The process according to claim 36 further comprising feeding the aqueous solution through the electrolytic cell in a single pass.

* * * * *